United States Patent
Bird et al.

(10) Patent No.: US 10,250,511 B2
(45) Date of Patent: Apr. 2, 2019

(54) PERSISTENT FLOW IDENTIFIERS ENABLING DISPARATE APPLICATIONS

(71) Applicants: Napatech A/S, Soborg (DK); International Business Machines Corporation, Armonk, NY (US)

(72) Inventors: William A. Bird, Fredericton (CA); Russell Couturier, Worcester, MA (US); Vijay Dheap, Durham, NC (US); Patrick V. Johnstone, Southwick, MA (US); Ben A. Wuest, Fredericton (CA); Alex Omø Agerholm, Søborg (DK)

(73) Assignee: International Business Machines Corporation, Armonk, NY (US)

( * ) Notice: Subject to any disclaimer, the term of this patent is extended or adjusted under 35 U.S.C. 154(b) by 251 days.

(21) Appl. No.: 15/179,442

(22) Filed: Jun. 10, 2016

(65) Prior Publication Data
US 2017/0359264 A1  Dec. 14, 2017

(51) Int. Cl.
*H04L 12/26* (2006.01)
*H04L 12/851* (2013.01)
(Continued)

(52) U.S. Cl.
CPC ........ *H04L 47/2441* (2013.01); *H04L 43/026* (2013.01); *H04L 43/106* (2013.01);
(Continued)

(58) Field of Classification Search
None
See application file for complete search history.

(56) References Cited

U.S. PATENT DOCUMENTS

| 7,813,350 B2 | 10/2010 | Singh et al. |
| 8,140,580 B2 | 3/2012 | Rehm et al. |

(Continued)

FOREIGN PATENT DOCUMENTS

| CN | 101222626 A | 7/2008 |
| CN | 101854286 A | 10/2010 |

(Continued)

OTHER PUBLICATIONS

Anonymously; "Method and System for Communicating with a User Using a Unique Identifier"; http://ip.com/IPCOM/000198956D; Aug. 18, 2010.
(Continued)

*Primary Examiner* — Bob A Phunkulh
(74) *Attorney, Agent, or Firm* — Pepper Hamilton LLP

(57) ABSTRACT

Embodiments provide a system and method for network tracking. By using packet capture applications having a flow identifier and a time stamper, one or more raw packets from one or more packet flows intercepted from a network can be tagged with a unique identifier and timestamp that can later be used to aggregate packet flows that have been analyzed by one or more capture applications. The unique identifier can relate to the network interface of the particular capture application and can also have an increasing value, where the increase in value can be monotonic. Later capture applications, while capable of generating secondary timestamps, can disregard those secondary timestamps for the primary timestamp of the first capture application in order to remove complications arising from latency issues.

18 Claims, 4 Drawing Sheets

(51) Int. Cl.
*H04L 12/853* (2013.01)
*H04L 29/06* (2006.01)

(52) U.S. Cl.
CPC .......... *H04L 43/12* (2013.01); *H04L 47/2416* (2013.01); *H04L 69/28* (2013.01); *Y02D 50/30* (2018.01)

(56) References Cited

U.S. PATENT DOCUMENTS

| | | | |
|---|---|---|---|
| 8,520,540 B1 | 8/2013 | Foschiano et al. | |
| 8,635,617 B2 | 1/2014 | Adler | |
| 2006/0209702 A1* | 9/2006 | Schmitt | H04L 41/00 370/252 |
| 2007/0189509 A1 | 8/2007 | Foody et al. | |
| 2010/0260204 A1* | 10/2010 | Pepper | H04L 43/106 370/474 |
| 2011/0026406 A1* | 2/2011 | Gamage | H04L 43/106 370/241 |
| 2011/0128885 A1 | 6/2011 | Breslin et al. | |
| 2011/0211593 A1* | 9/2011 | Pepper | H04L 43/028 370/474 |
| 2013/0142205 A1* | 6/2013 | Munoz | H04L 45/08 370/419 |
| 2013/0246613 A1* | 9/2013 | Kawaba | H04L 43/10 709/224 |
| 2014/0029617 A1* | 1/2014 | Wang | H04L 45/38 370/392 |
| 2014/0355613 A1* | 12/2014 | Pope | H04L 49/20 370/392 |
| 2016/0021156 A1* | 1/2016 | Fomenko | H04L 65/4069 709/231 |
| 2016/0104242 A1* | 4/2016 | Melton | G06Q 40/04 705/37 |
| 2017/0085581 A1* | 3/2017 | Jackson | H04L 63/1416 |
| 2017/0250889 A1* | 8/2017 | Vogt | H04L 43/0888 |

FOREIGN PATENT DOCUMENTS

| | | |
|---|---|---|
| CN | 103780610 A | 5/2014 |
| EP | 1715622 A1 | 10/2006 |

OTHER PUBLICATIONS

IPCOM000219176D; "Multi Channel Interaction Row Management"; http://ip.com/IPCOM/000219176D; Jun. 25, 2012.
International Search Report and Written Opinion dated Sep. 27, 2017 in corresponding International Patent Application No. PCT/IB2017/053462.
Examination Report dated Jan. 23, 2019 in corresponding British Patent Application No. GB1900217.9.

* cited by examiner

PERSISTENT FLOW IDENTIFIERS ENABLING DISPARATE APPLICATIONS

TECHNICAL FIELD

The present application relates generally to a system and method that can be used to identify discrete network flows routed through one or more network applications for later aggregations.

BACKGROUND

Network security and analysis typically uses a variety of discrete network analysis applications to capture, track, and analyze network packet data to protect networks from malicious attacks. Typical network capture applications, which can also be used in applications outside of network security, have limited resources, resulting in a decreased capacity to work in tandem and subsequently provide network administrators the ability to perform multiple analyses in real-time on the same packet flow.

For instance, a packet capture application typically has only enough resources to capture the packets, write all packets to a disk, and apply a light index to allow retrieval of the packets designated by their 5-tuple (a set of five different values comprising a TCP/IP connection, including destination and source IP addresses and port numbers, as well as the particular protocol (for example, TCP or UDP) used by the transmission), which is dictated by a third-party application. Similarly, a flow capture application has only enough resources to inspect the packets and store a flow record of the 5-tuple and any number of additional flow attributes. These resource constraints prevent multiple disparate applications from working on packet flows in a collective manner.

Capture applications are required to inspect packets in real-time for security purposes. In many cases, disparate capture applications inspect the same packet flow, but due to slight differences in packet timing, packet collections cannot be assimilated. Packet timing differs because the capture arrival rates are different from the time the local hardware or software applies a timestamp. Because the timing is different, it is impossible to have 100% accuracy in determining consistent flow identification. A packet flow cannot be uniquely identified by its 5-tuple and timing when packet traffic density may be in the hundreds of thousands of flows per second.

SUMMARY

Embodiments can provide a computer implemented method in a data processing system comprising a processor and a memory comprising instructions, which are executed by the processor to cause the processor to implement a network tracking system, the method comprising receiving, through a network tap, one or more packet flows comprising one or more packets, transmitted through a network; identifying, through a flow inspector, one or more beginning packets of the one or more packet flows; tagging, through the flow inspector, each packet of the one or more packet flows with a unique identifier; tagging, through a time stamper, each packet of the one or more packet flows with a timestamp; and forwarding, through the network tracking system, one or more tagged packets to one or more secondary systems connected to the network.

Further embodiments can provide a method that can comprise tagging, through the time stamper, the timestamp based on the time the one or more beginning packets for the packet flow is identified.

Further embodiments can provide a method that can comprise associating, through the flow inspector, the unique identifier with an identifier of the network tap.

Further embodiments can provide a method that can comprise increasing, through the flow inspector, the unique identifier monotonically in value with each unique packet flow identified.

Further embodiments can provide a method that can comprise tagging, through the flow inspector, the one or more packet flows through packet encapsulation.

Further embodiments can provide a method that can comprise tagging, through the flow inspector, the one or more packet flows through one or more firmware application program interfaces.

Further embodiments can provide a computer implemented method in a data processing system comprising a processor and a memory comprising instructions, which are executed by the processor to cause the processor to implement a network tracking system, the method comprising receiving from a network, through a first capture application comprising a time stamper and a flow inspector, one or more packet flows comprising one or more raw packets; tagging, through the time stamper, each raw packet with a timestamp; tagging, through the flow inspector, each raw packet with a unique identifier; and storing, using a packet repository, the one or more tagged packets.

Further embodiments can provide a method that can comprise receiving from a network, through one or more additional first capture applications each comprising a time stamper and a flow inspector, the one or more packet flows; tagging, through each time stamper, each raw packet with a timestamp; tagging, through each flow inspector, each raw packet with a unique identifier; and storing, through the packet repository, the one or more tagged packets.

Further embodiments can provide a method that can comprise aggregating, through the packet repository, the one or more tagged packets using each tagged packet's unique identifier.

Further embodiments can provide a method that can comprise associating, through each flow inspector, the unique identifier with the particular first capture application.

Further embodiments can provide a method that can comprise increasing, through each flow inspector, the unique identifier monotonically in value with each unique packet flow identified by the particular first capture application.

Further embodiments can provide a method that can comprise tagging, through each flow inspector, the one or more packet flows through packet encapsulation.

Further embodiments can provide a method that can comprise tagging, through each flow inspector, the one or more packet flows through one or more firmware application program interfaces.

Further embodiments can provide a computer implemented method in a data processing system comprising a processor and a memory comprising instructions, which are executed by the processor to cause the processor to implement a network tracking system, the method comprising tagging, through one or more first capture applications, one or more packet flows comprising one or more raw packets of network data with a unique identifier and a primary timestamp; forwarding, through the one or more first capture applications, one or more tagged packet flows to one or more other capture applications; and aggregating, through the one or more other capture applications, the one or more tagged packet flows forwarded from the one or more first capture applications based on each tagged packet flow's unique identifier.

Further embodiments can provide a method that can comprise tagging, through the one or more other capture applications, the one or more tagged packet flows received by the one or more other capture applications with a secondary timestamp based on the time received by the one or more other capture applications.

Further embodiments can provide a method that can comprise replacing, through the one or more other capture applications, the secondary timestamp with the primary timestamp assigned by the one or more first capture applications.

Further embodiments can provide a method that can comprise associating, through each first capture application, the unique identifier with the particular first capture application.

Further embodiments can provide a method that can comprise increasing, through each first capture application, the unique identifier monotonically in value with each unique packet flow identified by the particular first capture application.

Further embodiments can provide a method that can comprise tagging, through each first capture application, the one or more packet flows through packet encapsulation.

Further embodiments can provide a method that can comprise tagging, through each first capture application, the one or more packet flows through one or more firmware application program interfaces.

Additional features and advantages of this disclosure will be made apparent from the following detailed description of illustrative embodiments that proceeds with reference to the accompanying drawings.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
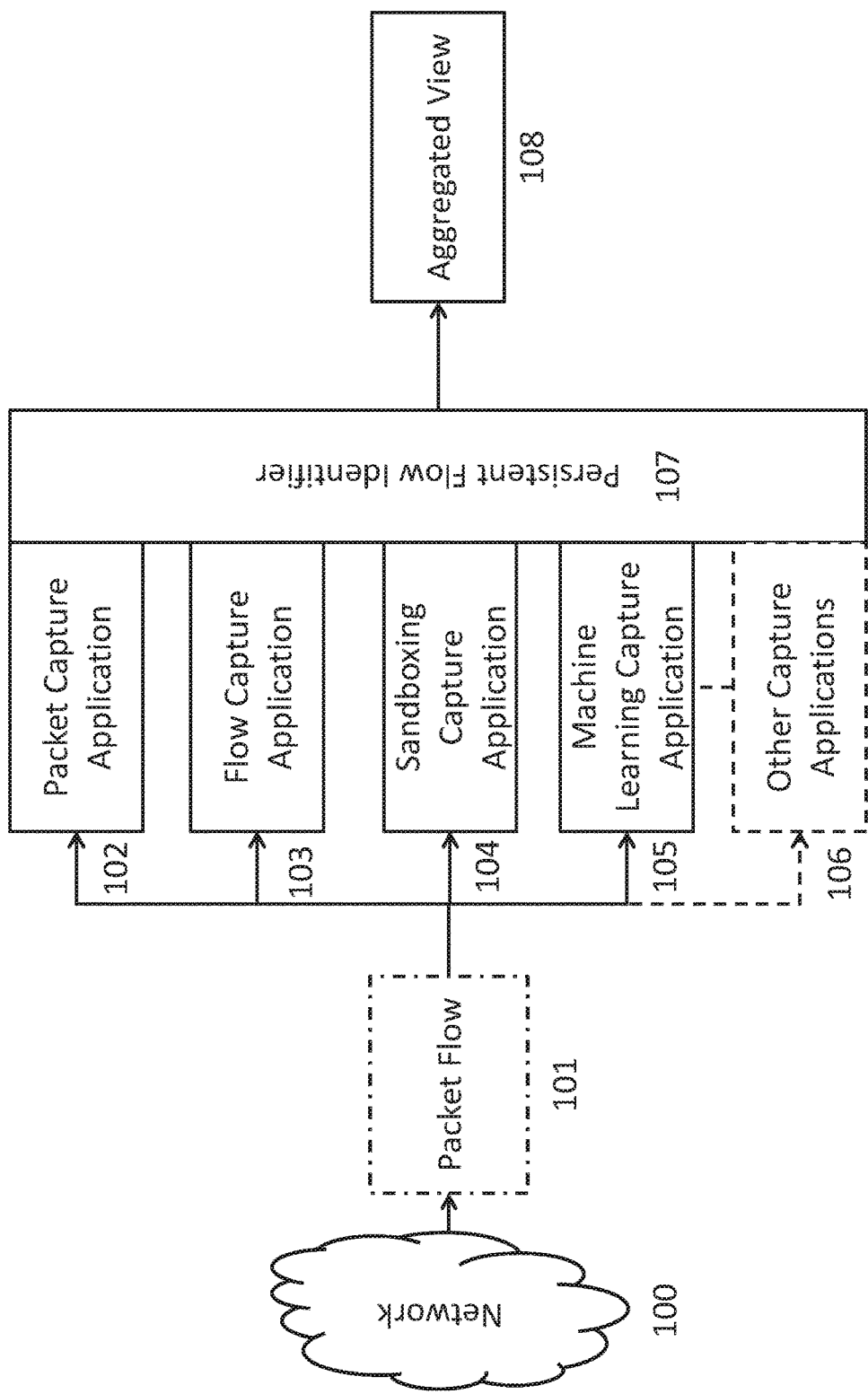
FIG. 1 depicts a schematic diagram of one illustrative embodiment of a network tracking system.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within in the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 depicts a schematic diagram of one illustrative embodiment of a network tracking system. In order to provide security to a networked system, system administrators may use a variety of capture applications 102, 103, 104, 105, 106 in order to analyze one or more packet flows 101 captured from traffic taken from a particular network 100. The network 100 can be an intra-office network, inter-office network, or a distributed network, such as the Internet. A packet flow 101, which can also be referred to as a packet stream, can be comprised of one or more packets of information travelling from a source to one or more destinations. As part of a network security or other network analysis infrastructure, the packet flows, in addition to being routed to their intended destination, can be concurrently routed through one or more capture applications. However, as will be described in FIG. 3, due to inherent lag times associated with network traffic, one of the one or more capture applications will receive the packet flow first, and can perform the tagging functionality according to embodiments described herein.

Examples of potential capture applications that can be used in a network tracking system can include, but are not limited to, a packet capture application 102, a flow capture application 103, a sandboxing capture application 104, and a machine learning capture application 105. An exemplar packet capture application 102 can capture the one or more packets of a packet flow, writes those packets to a disk or repository, and can apply a light index to the captured packets in order to facilitate later retrieval of those packets based on their 5-tuple from a third-party application. An exemplar flow capture application 103 can inspect the one or more packets and store a flow record of the 5-tuple, as well as other flow attributes (source/destination MAC address, hash values, file sizes, file names, etc.), to a disk or repository. An exemplar sandboxing capture application 104 can emulate one or more untrusted or unknown packet flows in a real-time virtual environment prior to the one or more packet flows reaching their destination, in order to assess if there are any security vulnerabilities associated with the particular packet flow (for instance, if the files associated with the packet flow contain malware or a virus), and can create a report detailing any vulnerabilities or other information found. An exemplar machine learning capture application 105 can use one or more machine learning techniques (for example, classification, clustering, association, numeric prediction, neural networking, decision trees, etc.) to analyze trends associated with large volumes of packet flow data in order to find or predict security vulnerabilities or network attacks. In embodiments, other capture applications 106 beyond the listed examples can be incorporated into the network system. In an embodiment, one or more capture applications, or a combination thereof, can be incorporated into the network tracking system.

In an embodiment, as the one or more packet flows 101 enter and are analyzed by the one or more capture applications 102, 103, 104, 105, the packet flows 101 are tagged with a persistent flow identifier 107 by the first capture application that receives the packet flow 101 (as shown in FIG. 1), which can allow the one or more analyzed packet flows to be aggregated and analyzed in an aggregated view 108 at some point in the future. The tagging of the packet flows 101 can be accomplished in a manner as described in more detail in FIGS. 2 and 3. By using the persistent flow identifier 107, one or more unique packet flows 101 captured by the packet capture application 102 can be paired with the flow records of the flow capture application 103 that match the persistent flow identifier 107. This can result in total visibility using the combined data set. In addition to combining the records of the packet capture application 102 and the flow capture application 103, the records of the sandboxing capture application 104, the machine learning capture application 105 and/or the other capture applications 106, can be combined in a similar manner using the persistent flow identifier 107.

Figure 2:
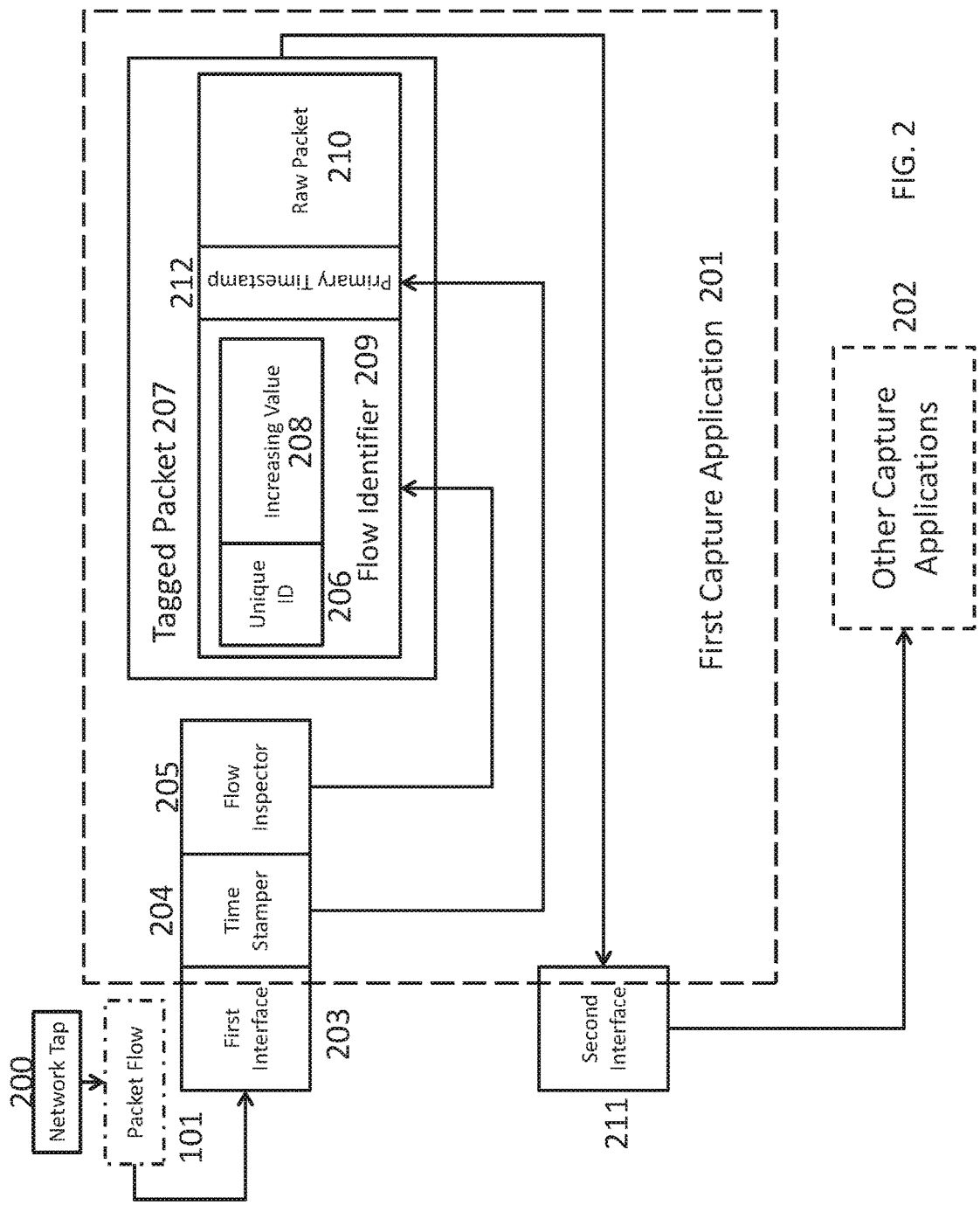
FIG. 2 depicts a schematic diagram of a network tracking system, according to embodiments described herein.

FIG. 2 depicts a schematic diagram of the network tracking system, according to embodiments described herein. In an embodiment, a primary network tap 200 can intercept all network traffic, which can comprise one or more packet flows 101, each packet flow 101 having one or more raw packets of information 210. The network tap 200 can route the packet flows 101 to a first interface (capture point) 203. In an embodiment, the first interface 203 can be the primary interface located on the first capture application 201 to receive the particular packet flow 101. In an embodiment, each capture application can have a first interface 203 and a second interface 211. However, in an embodiment, the first interface 203 of the first capture application 201 can be the main determinate factor for assigning a flow identifier 209 and a primary timestamp 212. A flow inspector 205, in communication with the first interface 203, can identify the beginning packets associated with each packet flow 101 using standard inspection algorithms. The flow inspector 205 can tag each raw packet 210 with a flow identifier 209, creating a tagged packet 207.

The flow identifier 209 can comprise two components: a unique identifier (unique ID) 206 and a monotonically increasing value 208. The unique identifier 206 can be based upon a globally unique identifier of the particular capture application the particular packet is being analyzed by, for example, the MAC address of the network interface card of the network tap 200. The monotonically increasing value 208 can increase for each packet flow tagged by the flow inspector 205. In an embodiment, the increasing value 208 can increase in a non-monotonic manner. In an embodiment, the value range for the increasing value 208 can be large enough to uniquely identify individual packet flows 101 over a multi-year period without duplication.

A time stamper 204, which can also be in communication with the first interface 203, can stamp each raw packet with a primary timestamp 212 that can correspond with the first observation of the raw packets 210 by the first interface 203. The primary timestamp 212 can be persistent, travelling with the tagged packet 207 and overwriting any subsequent attempts to re-timestamp the tagged packet 207. The overwriting is described in greater detail in FIG. 3.

The tagging of the raw packet 210 by the flow inspector 205 and time stamper 204 can be accomplished through a variety of methods. In an embodiment, the raw packets 210 can be encapsulated using a proprietary method similar to VLAN tagging. In an alternate embodiment, the raw packets 210 can be encapsulated using a standard encapsulation method such as Per Packet Information (PPI). In an alternate embodiment, the raw packets 210 can be tagged using hardware application programming interfaces (APIs), for example, a Field Programmable Gate Array (FPGA) API for a network interface card.

Once the raw packets 210 are tagged with a primary timestamp 212 and a flow identifier 209, the tagged packets 207 can be forwarded to a second interface (capture point) 211 to be analyzed by one or more other applications 202. The second interface 211 can be similar in function to the original network tap 200. The second interface 211 can receive one or more tagged packets 207. However, the second interface 211 can have a priori information regarding the particular tagging format used to tag the raw packets 210. While the second interface 211 can have the capacity to tag the tagged packets 207 with a secondary timestamp, the network system can always replace or disregard the secondary timestamp with the primary timestamp 212, as the secondary timestamp will always contain unwanted latency associated with the processing of the one or more packets by the particular capture application and then forwarding the packets to the second interface 211. In an embodiment, this latency is non-consequential and thus the replacement of the secondary timestamp with the primary timestamp 212 is optional.

Figure 3:
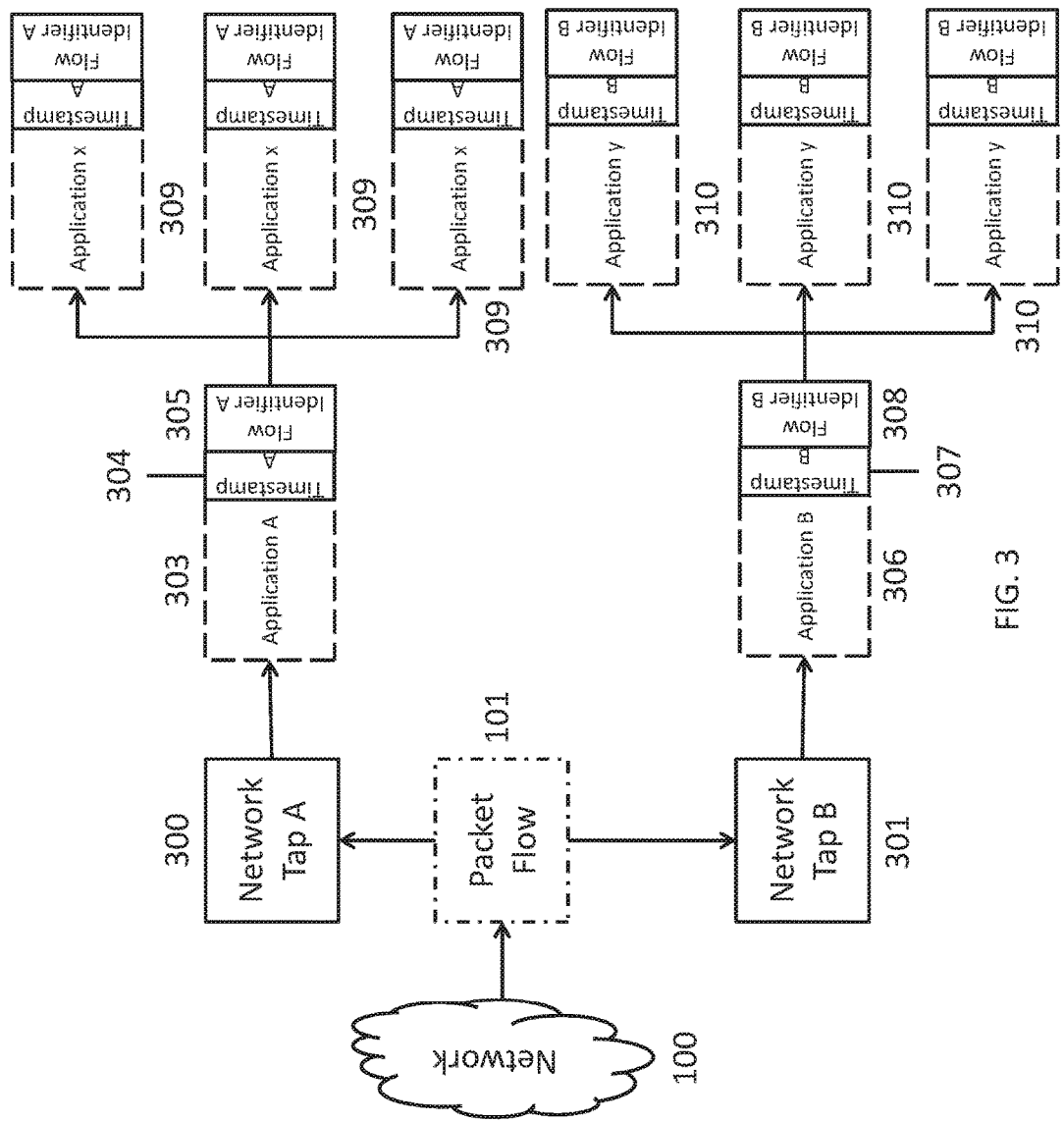
FIG. 3 depicts a block diagram illustrating the functionality of a network tracking system, according to embodiments described herein.

FIG. 3 is a block diagram representative of the functionality of the network tracking system over time, according to embodiments described herein. While FIG. 3 describes a particular arrangement of network components (network taps and capture applications), the network tracking system can function in the same manner as described even under a different arrangement of network components. As shown in the embodiment described in FIG. 3, one or more packet flows 101 originating from a network 100 can be concurrently intercepted by network tap A 300 and network tap B 301. While two network taps are shown in the figure, there is no limit to the number of network taps that could intercept a particular packet flow 101. Upon interception by network tap A 300, the packet flow 101 can be routed to the first interface of capture application A 303. In an embodiment, while particular network architecture may have each capture application connected in a parallel fashion (as shown in FIG. 1), capture application A 303 can be defined as the first capture application in time to receive the packet flow 101. Depending on the network architecture of the particular infrastructure the network tracking system is applied on, capture application A's identity may vary based on the multiplexing capabilities of the network tap A (i.e. for the first packet flow received capture application A is the packet capture application, for the second packet flow the capture application A may be the machine learning capture application, etc.), or capture application A may remain the same application for each packet flow received. In an embodiment, the functionality, type, number and connection architecture of capture applications connected to network tap B 301 and all other network taps can mirror that of those connected to network tap A 300, or they can be different depending on the particular need. As each capture application can have the same tagging functionality as described in FIG. 2, each capture application in the network tracking system can act as the first capture application (201 as shown in FIG. 2) in their particular network domain.

As the packet flow 101 is intercepted by network tap A 300 and routed to capture application A 303, each packet of the packet flow 101 can be tagged with timestamp A 304 and flow identifier A 305 as described herein. In an embodiment, the tagged packets are sent to other capture applications x 309 connected to network tap A 300. However, while the other capture applications x 309 may or may not apply their own timestamp and/or flow identifier to the packets, in an embodiment all secondary timestamps and/or flow identifiers can be disregarded over the primary timestamp A 304, such that a common timestamp and/or flow identifier is applied to all packets intercepted by network tap A 300.

Similarly, as the packet flow 101 is intercepted by network tap B 301 and routed to capture application B 306, each packet of the packet flow 101 can be tagged with timestamp B 307 and flow identifier B 308 as described herein. In an embodiment, the tagged packets are sent to other capture applications y 310 connected to network tap B 301. However, while the other capture applications y 310 may or may not apply their own timestamp and/or flow identifier to the packets, in an embodiment all secondary timestamps and/or flow identifiers can be disregarded over the primary timestamp B 307, such that a common timestamp and/or flow identifier is applied to all packets intercepted by network tap B 301.

Replacement of any secondary timestamps and/or flow identifiers with the primary timestamp and/or flow identifier can be necessary to the functioning of the network tracking system, as secondary timestamps and/or flow identifiers commonly will have a timestamp and/or flow identifier value based on the initial tap point in addition to latency times associated with forwarding the packet flows to secondary tap points. However, in alternate network embodiments where latency is considered non-consequential, the replacement of secondary timestamps and/or flow identifier with primary timestamps and/or flow identifiers can be optional.

In an embodiment, timestamps and flow identifiers can be assigned to packet flows passing through any addition network domains (as defined by their respective network taps) in the same manner as described herein. Though this consistent manner of tagging packet flows, aggregated views of the packets analyzed by the one or more capture applications included in the network tracking system can be created by sorting based on the common timestamps and flow identifiers.

Figure 4:
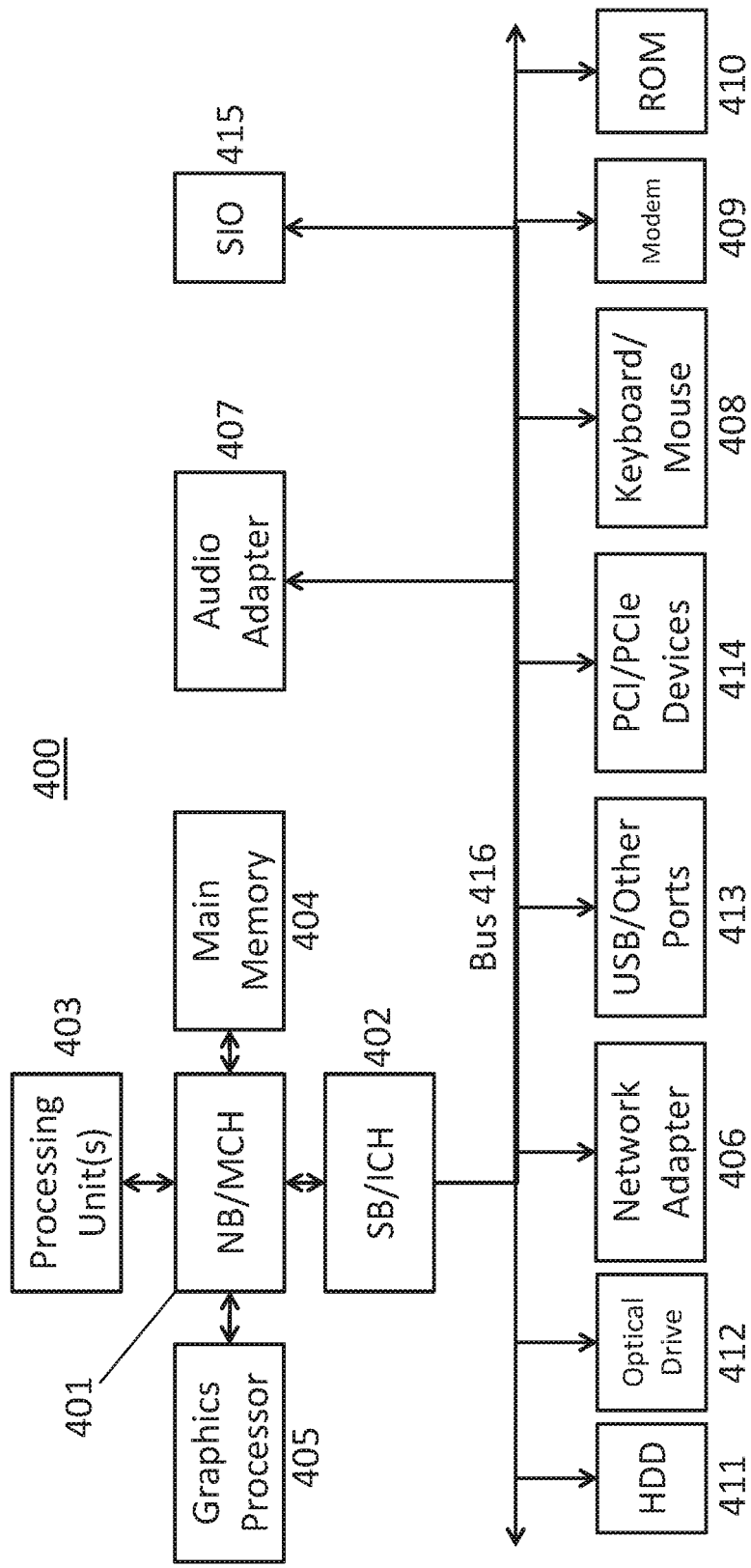
FIG. 4 is a block diagram of an example data processing system in which aspects of the illustrative embodiments are implemented.

FIG. 4 is a block diagram of an example data processing system 400 in which aspects of the illustrative embodiments, such as the capture applications, can be implemented. Data processing system 400 is an example of a computer, such as a server or client, in which computer usable code or instructions implementing the process for illustrative embodiments of the present invention are located. In one embodiment, FIG. 4 represents a server computing device, such as a server, which implements the network tracking system described herein.

In the depicted example, data processing system 400 can employ a hub architecture including a north bridge and memory controller hub (NB/MCH) 401 and south bridge and input/output (I/O) controller hub (SB/ICH) 402. Processing unit 403, main memory 404, and graphics processor 405 can be connected to the NB/MCH 401. Graphics processor 405 can be connected to the NB/MCH through an accelerated graphics port (AGP).

In the depicted example, the network adapter 406 connects to the SB/ICH 402. The audio adapter 407, keyboard and mouse adapter 408, modem 409, read only memory (ROM) 410, hard disk drive (HDD) 411, optical drive (CD or DVD) 412, universal serial bus (USB) ports and other communication ports 413, and the PCI/PCIe devices 414 can connect to the SB/ICH 402 through bus system 416. PCI/PCIe devices 414 may include Ethernet adapters, add-in cards, and PC cards for notebook computers. ROM 410 may be, for example, a flash basic input/output system (BIOS). The HDD 411 and optical drive 412 can use an integrated drive electronics (IDE) or serial advanced technology attachment (SATA) interface. The super I/O (SIO) device 415 can be connected to the SB/ICH.

An operating system can run on processing unit 403. The operating system can coordinate and provide control of various components within the data processing system 400. As a client, the operating system can be a commercially available operating system. An object-oriented programming system, such as the Java™ programming system, may run in conjunction with the operating system and provide calls to the operating system from the object-oriented programs or applications executing on the data processing system 400. As a server, the data processing system 400 can be an IBM® eServer™ System p® running the Advanced Interactive Executive operating system or the Linux operating system. The data processing system 400 can be a symmetric multiprocessor (SMP) system that can include a plurality of processors in the processing unit 403. Alternatively, a single processor system may be employed.

Instructions for the operating system, the object-oriented programming system, and applications or programs are located on storage devices, such as the HDD 411, and are loaded into the main memory 404 for execution by the processing unit 403. The processes for embodiments of the network tracking system can be performed by the processing unit 403 using computer usable program code, which can be located in a memory such as, for example, main memory 404, ROM 410, or in one or more peripheral devices.

A bus system 416 can be comprised of one or more busses. The bus system 416 can be implemented using any type of communication fabric or architecture that can provide for a transfer of data between different components or devices attached to the fabric or architecture. A communication unit such as the modem 409 or network adapter 406 can include one or more devices that can be used to transmit and receive data.

Those of ordinary skill in the art will appreciate that the hardware depicted in FIG. 4 may vary depending on the implementation. Other internal hardware or peripheral devices, such as flash memory, equivalent non-volatile memory, or optical disk drives may be used in addition to or in place of the hardware depicted. Moreover, the data processing system 400 can take the form of any of a number of different data processing systems, including but not limited to, client computing devices, server computing devices, tablet computers, laptop computers, telephone or other communication devices, personal digital assistants, and the like. Essentially, data processing system 400 can be any known or later developed data processing system without architectural limitation.

The system and processes of the figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers and processes can be implemented using hardware components, software components, and/or combinations thereof. No claim element herein is to be construed under the provisions of 35 U.S.C. 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer implemented method in a data processing system comprising a processor and a memory comprising instructions, which are executed by the processor to cause the processor to implement a network tracking system, the method comprising:
   receiving, through a network tap, one or more packet flows comprising one or more packets, transmitted through a network;
   identifying, through a flow inspector, one or more beginning packets of the one or more packet flows;
   tagging, through the flow inspector, each packet of the one or more packet flows with a flow identifier, wherein the flow identifier includes a unique identifier and a monotonically increasing value, wherein the monotonically increasing value increases with each unique packet flow, and the monotonically increasing value is large enough to uniquely identify individual packet flows over a multi-year period without duplication;
   tagging, through a time stamper, each packet of the one or more packet flows with a timestamp; and
   forwarding, through the network tracking system, one or more tagged packets to one or more secondary systems connected to the network.

2. The method as recited in claim 1, further comprising:
   tagging, through the time stamper, the timestamp based on the time the one or more beginning packets for the packet flow are identified.

3. The method as recited in claim 1, further comprising:
   associating, through the flow inspector, the flow identifier with an identifier of the network tap.

4. The method as recited in claim 1, further comprising:
   tagging, through the flow inspector, the one or more packet flows through packet encapsulation.

5. The method as recited in claim 1, further comprising:
   tagging, through the flow inspector, the one or more packet flows through one or more firmware application program interfaces.

6. The method as recited in claim 1, wherein the unique identifier is a MAC address of a network interface card of the network tap.

7. A computer implemented method in a data processing system comprising a processor and a memory comprising instructions, which are executed by the processor to cause the processor to implement a network tracking system, the method comprising:
   receiving from a network, through a first capture application comprising a time stamper and a flow inspector, one or more packet flows comprising one or more raw packets;
   tagging, through the time stamper, each raw packet with a timestamp;
   tagging, through the flow inspector, each raw packet with a flow identifier, wherein the flow identifier includes a unique identifier and a monotonically increasing value, wherein the monotonically increasing value increases with each unique packet flow, and the monotonically increasing value is large enough to uniquely identify individual packet flows over a multi-year period without duplication; and
   storing, using a packet repository, the one or more tagged packets.

8. The method as recited in claim 7, further comprising:
   receiving from a network, through one or more additional first capture applications each comprising a time stamper and a flow inspector, the one or more packet flows;
   tagging, through each time stamper, each raw packet with a timestamp;
   tagging, through each flow inspector, each raw packet with a flow identifier; and
   storing, through the packet repository, the one or more tagged packets.

9. The method as recited in claim 8, further comprising:
   aggregating, through the packet repository, the one or more tagged packets using each tagged packet's flow identifier.

10. The method as recited in claim 8, further comprising associating, through each flow inspector, the flow identifier with the particular first capture application.

11. The method as recited in claim 7, further comprising:
    tagging, through each flow inspector, the one or more packet flows through packet encapsulation.

12. The method as recited in claim 7, further comprising:
    tagging, through each flow inspector, the one or more packet flows through one or more firmware application program interfaces.

13. A computer implemented method in a data processing system comprising a processor and a memory comprising instructions, which are executed by the processor to cause the processor to implement a network tracking system, the method comprising:
    tagging, through one or more first capture applications, one or more packet flows comprising one or more raw packets of network data with a flow identifier and a primary timestamp, wherein the flow identifier includes a unique identifier and a monotonically increasing value, wherein the monotonically increasing value increases with each unique packet flow, and the monotonically increasing value is large enough to uniquely identify individual packet flows over a multi-year period without duplication;
    forwarding, through the one or more first capture applications, one or more tagged packet flows to one or more other capture applications; and
    aggregating, through the one or more other capture applications, the one or more tagged packet flows forwarded from the one or more first capture applications based on each tagged packet flow's flow identifier.

14. The method as recited in claim 13, further comprising:
    tagging, through the one or more other capture applications, the one or more tagged packet flows received by the one or more other capture applications with a secondary timestamp based on the time received by the one or more other capture applications.

15. The method as recited in claim 14, further comprising:
    replacing, through the one or more other capture applications, the secondary timestamp with the primary timestamp assigned by the one or more first capture applications.

16. The method as recited in claim 13, further comprising associating, through each first capture application, the flow identifier with the particular first capture application.

17. The method as recited in claim 13, further comprising:
tagging, through each first capture application, the one or more packet flows through packet encapsulation.

18. The method as recited in claim 13, further comprising:
tagging, through each first capture application, the one or more packet flows through one or more firmware application program interfaces.

* * * * *